Jan. 29, 1952 G. E. DATH 2,583,635
FRICTION SHOCK ABSORBER FOR RAILWAY CAR TRUCK SPRINGS
Filed Aug. 4, 1948
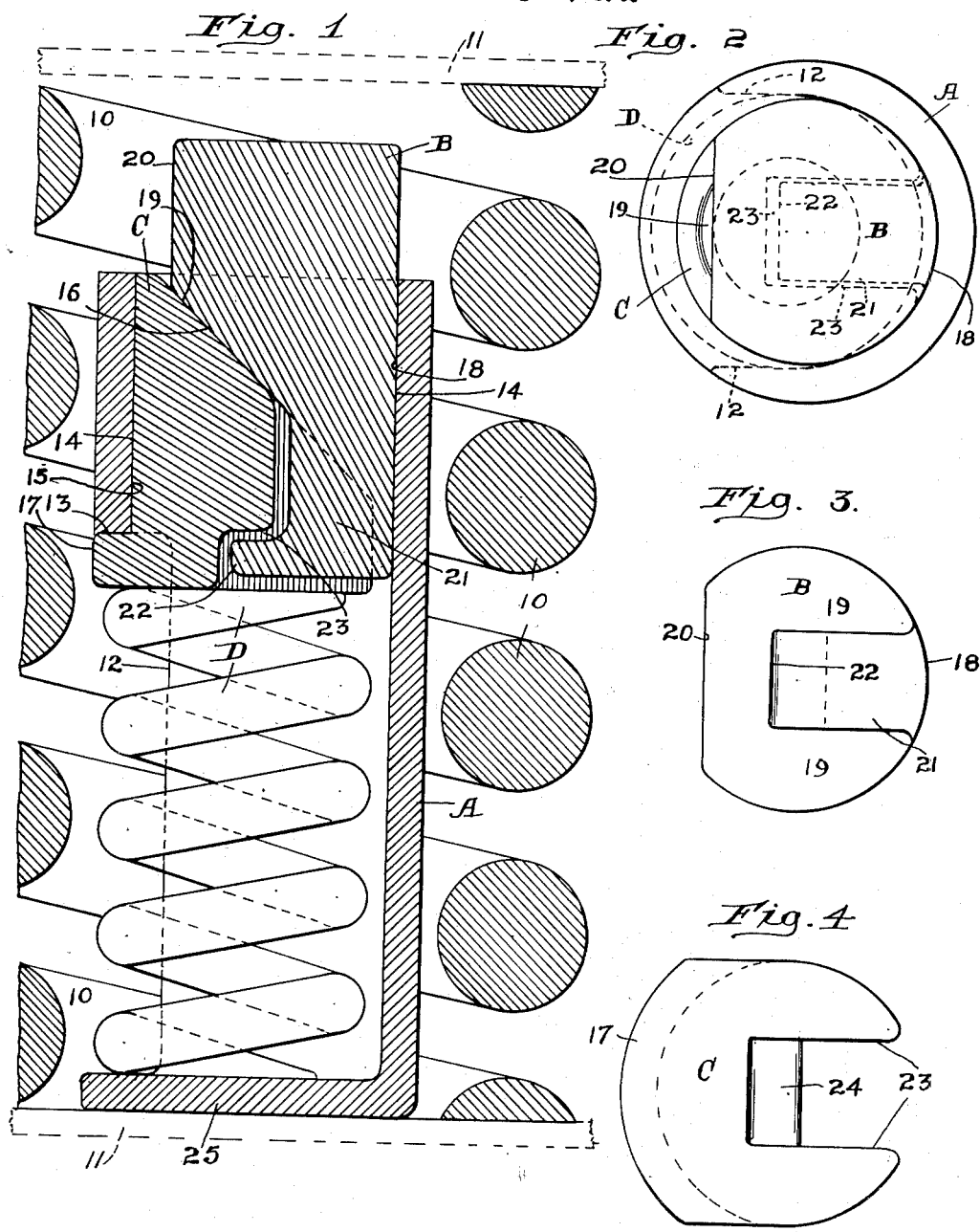
Inventor:
George E. Dath.
By
Henry Fuchs.
Attys.

Patented Jan. 29, 1952

2,583,635

UNITED STATES PATENT OFFICE 2,583,635

FRICTION SHOCK ABSORBER FOR RAILWAY CAR TRUCK SPRINGS

George E. Dath, Mokena, Ill., assignor to W. H. Miner, Inc., Chicago, Ill., a corporation of Delaware Application August 4, 1948, Serial No. 42,394

4 Claims. (Cl. 267—9)

This invention relates to improvements in friction shock absorbers, especially adapted for snubbing the action of truck springs of railway cars.

One object of the invention is to provide a friction shock absorber of the character indicated, designed to replace the inner coil spring of a truck spring member composed of inner and outer coils.

A more specific object of the invention is to provide a shock absorber of this type, comprising a friction casing, a friction shoe, a cooperating wedge member slidingly telescoped within the casing, and a spring within the casing yieldingly opposing inward movement of the shoe and wedge member, wherein the shoe has shouldered engagement with the casing to limit outward movement thereof, and the wedge member has shouldered engagement with the shoe to hold the latter against outward movement with respect to the shoe and in assembled relation with the other parts of the device.

Other objects of the invention will more clearly appear from the description and claims hereinafter following.

In the accompanying drawing forming a part of this specification, Figure 1 is a transverse vertical sectional view of my improved friction shock absorber, illustrating the same disposed within the outer coil of one of the spring units of a truck spring cluster, the spring being also shown in transverse vertical section and the spring follower plates of the cluster being indicated in dotted lines. Figure 2 is a top plan view of the friction shock absorber shown in Figure 1. Figure 3 is a bottom plan view of the wedge member of the improved shock absorber. Figure 4 is a bottom plan view of the friction shoe.

Referring to the drawing, 10 indicates the outer coil spring of one of the spring units of a truck spring cluster, and 11—11 the top and bottom follower plates of said cluster, the follower plates being indicated in dotted lines.

My improved friction shock absorber, as illustrated in the drawing, is disposed within the coil spring 10 and comprises broadly a friction casing A, a wedge block B, a friction shoe C, and a spring D.

The friction casing A is in the form of a cylindrical tubular member open at its upper end and closed by a transverse bottom wall 25 at its lower end. The casing A is provided with an opening 12 through the side wall thereof at one side of the casing, which opening terminates short of the upper end of the casing, thereby providing a transverse stop shoulder 13. The interior of the casing is of circular cross section and presents a cylindrical friction surface 14.

The friction shoe C is in the form of a block having a longitudinally extending, transversely curved friction surface 15 on its outer side engaging the friction surface 14 of the casing at the corresponding side of the device. On the inner side, at the forward end thereof, the shoe C has a flat wedge face 16 with which the wedge block B is engaged. The shoe C is disposed within the casing at the side thereof which is provided with the opening 12 and has a laterally outwardly projecting, horizontal flange 17 at its lower end, extending into the opening 12 and engageable with the shoulder 13 to limit outward movement of said shoe.

The wedge block B is disposed at the side of the mechanism opposite to the shoe C and has a longitudinally extending, transversely curved friction surface 18 on its outer side engaged with the friction surface 14 of the casing at the corresponding side thereof. On the inner side, the wedge block B is provided with a flat wedge face 19, correspondingly inclined to and engaged with the wedge face 16 of the shoe. The wedge block B normally projects outwardly of the casing and has a flat transverse end face 20 at its outer end adapted to receive the actuating force. At its inner or lower end, the wedge block B has a depending extension 21 of reduced width provided with a laterally projecting lip or lug 22 at its lower end. The shoe C is cut out, as indicated at 23, to accommodate the reduced extension 21 of the wedge block, and the inner wall of said cut out portion is undercut, as shown, to accommodate the lug 22 and provide a transverse stop shoulder 24 with which the lug is engageable to limit outward movement of the wedge with respect to the shoe.

The spring D, which is in the form of a helical coil, is arranged within the casing A below the shoe C, and has its opposite ends bearing respectively on the bottom end of the shoe and the bottom wall 25 of the casing.

In assembling the mechanism, all of the parts are placed within the casing through the opening 12 in the side wall thereof, the opening 12 being of ample width to admit the wedge block, shoe, and spring. The wedge block B and the shoe C are first placed within the casing and moved outwardly to the position shown in Figure 1 with the flange 17 of the shoe engaged in back of the shoulder 13. The spring D is then placed in position within the casing below the shoe C by passing the same through the opening 12 while slightly compressed. The parts are proportioned so that in the full release position of the mechanism shown in Figure 1, the wedge block B has its inner end spaced from the upper end of the spring D, the upper end of the spring thus having direct engagement with the shoe only.

My improved shock absorber is substituted for the inner coil spring of one or more of the double coil units of a cluster of truck springs, and is preferably of such a height that a certain amount of clearance is provided between the top follower plate of the spring cluster and the upper end of the wedge block B, thereby delaying the snubbing action of the friction shock absorber until the truck springs have been partly compressed.

The operation of my improved friction shock absorber is as follows: Upon the spring cluster of a railway car truck being compressed between the top and bottom spring follower plates of the cluster, the top spring follower plate approaches the wedge block B until the clearance therebetween has been taken up, and upon further compression of the truck springs the top follower plate engages and forces the wedge block inwardly of the casing A and by its wedging engagement with the shoe carries the latter inwardly of the casing against the resistance of the spring D and forces the wedge and shoe apart into tight frictional engagement with the interior friction surface 14 of the casing. The desired snubbing action is thus produced during compression of the device by sliding frictional contact between the friction surfaces of the casing and wedge and shoe. During recoil of the truck springs, expansion of the spring D returns all of the parts of the friction shock absorber to the normal full release position shown in Figure 1.

I claim:

1. In a friction shock absorbing mechanism, the combination with a friction casing; of a wedge block slidingly telescoped within the casing and in frictional contact with the interior wall thereof; a friction shoe slidingly telescoped within the casing and in frictional contact with the interior wall thereof, said wedge being in wedging engagement with the shoe and projecting outwardly beyond said shoe; and a spring within the casing bearing on said shoe and yieldingly opposing inward movement thereof, said shoe having shouldered engagement with the casing to limit outward movement of the shoe, and said wedge block having shouldered engagement at its inner end with the inner end portion of the shoe to limit outward movement of said block.

2. In a friction shock absorbing mechanism, the combination with a friction casing having a lengthwise extending, interior friction surface; of a friction shoe slidingly telescoped within the casing; a wedge block movable lengthwise of the mechanism slidingly telescoped within the casing in frictional contact with said interior friction surface, said shoe and block having cooperating wedge faces, said wedge block projecting outwardly beyond the shoe to receive the actuating force; a stop shoulder at the inner end of said shoe; a lug on said block at the inner end thereof engageable with said shoulder to limit outward movement of the wedge block with respect to the shoe; a stop shoulder on said casing; a stop projection on said shoe engageable with said stop shoulder of the casing to limit outward movement of the shoe; and a spring within the casing yieldingly opposing inward movement of the shoe.

3. In a friction shock absorbing mechanism, the combination with a friction casing open at one end and closed at the other end, said casing having a lengthwise extending opening through the side wall thereof, said opening terminating short of the open end of the casing, the end wall of said opening at said open end of the casing providing a transverse stop shoulder; a friction shoe slidingly telescoped within the casing and having an outwardly extending stop projection thereon extending into the opening of the side wall of the casing and engageable with said transverse stop shoulder to limit outward movement of said shoe; a wedge block projecting outwardly beyond said shoe, said block being in wedging engagement with the shoe, said block being slidingly telescoped within the casing for movement lengthwise of the mechanism, in frictional engagement with the interior of said casing, and having shouldered engagement with the shoe to limit outward movement of said block; and spring means within the casing yieldingly opposing inward movement of said shoe.

4. In a friction shock absorbing mechanism, the combination with a friction casing open at one end; of a friction shoe slidingly telescoped within the open end of the casing; a wedge block in wedging engagement with the shoe and slidable within the open end of the casing, said block having a projecting stop lug thereon engageable with the shoe to limit outward movement of said block with respect to the shoe; a spring within the casing bearing on said shoe and yieldingly opposing inward movement thereof, said casing having an opening through the side wall thereof terminating short of the open end of said casing, the end wall of said opening adjacent said open end providing a transverse stop shoulder, said opening being of a size to permit the wedge block, shoe and spring to be passed therethrough into the casing; and a stop projection on said shoe extending into said opening of the side wall of the casing and engageable with said transverse stop shoulder to limit outward movement of said shoe with respect to the casing.

GEORGE E. DATH.

REFERENCES CITED

The following references are of record in the file of this patent:

UNITED STATES PATENTS

| Number | Name | Date |
| --- | --- | --- |
| 736,724 | Handiges | Aug. 18, 1903 |
| 849,562 | O'Connor | Apr. 9, 1907 |
| 1,953,219 | Fuchs | Apr. 3, 1934 |
| 2,329,338 | Dath | Sept. 14, 1943 |
| 2,379,078 | Haseltine | June 26, 1945 |
| 2,388,230 | Light | Oct. 30, 1945 |
| 2,398,749 | Light | Apr. 16, 1946 |